United States Patent [19]

Tyquin

[11] 4,366,775

[45] Jan. 4, 1983

[54] TRANSPORTABLE STOCK UNIT

[76] Inventor: Bryan J. Tyquin, P.O. Box 22, New Gisborne 3438, Australia

[21] Appl. No.: 236,150

[22] Filed: Feb. 20, 1981

Related U.S. Application Data

[63] Continuation-in-part of Ser. No. 54,852, Jul. 5, 1979, abandoned.

[51] Int. Cl.³ .............................................. A01K 29/00
[52] U.S. Cl. ........................................ 119/20; 119/82
[58] Field of Search ........................ 119/20, 82, 98, 99

[56] References Cited

U.S. PATENT DOCUMENTS

| | | | |
|---|---|---|---|
| 952,479 | 3/1910 | Strum | 119/98 |
| 1,517,573 | 12/1924 | Momyer | 119/99 |
| 3,084,669 | 4/1963 | May | 119/98 |
| 3,796,191 | 3/1974 | McIntire | 119/82 |
| 3,921,585 | 11/1975 | Hall | 119/20 |
| 3,929,104 | 12/1975 | Corbin | 119/82 |
| 4,201,157 | 5/1980 | Lambert | 119/82 |

Primary Examiner—Hugh R. Chamblee
Attorney, Agent, or Firm—Price, Heneveld, Huizenga & Cooper

[57] ABSTRACT

The invention relates to a transportable stock unit which comprises a stock race mounted on wheels and adapted to be towed behind a vehicle. The stock race has a number of wings swingably connected to the rear end thereof which can be swung out to form at least part of a stock yard. Other screens may be connected with the wings to complete or enlarge the stock yard. Stock may be retained in the yard and herded into the race for any desired treatment without the need to transport the stock to another location. Also disclosed are mechanisms for raising and lowering the wheels of the race so that the race may sit on the ground to stabilize the race. The floor of the race may be raised at one end to form a loading platform and a front gate may also embody a stock holding means for holding the stock while the stock is being treated.

21 Claims, 20 Drawing Figures

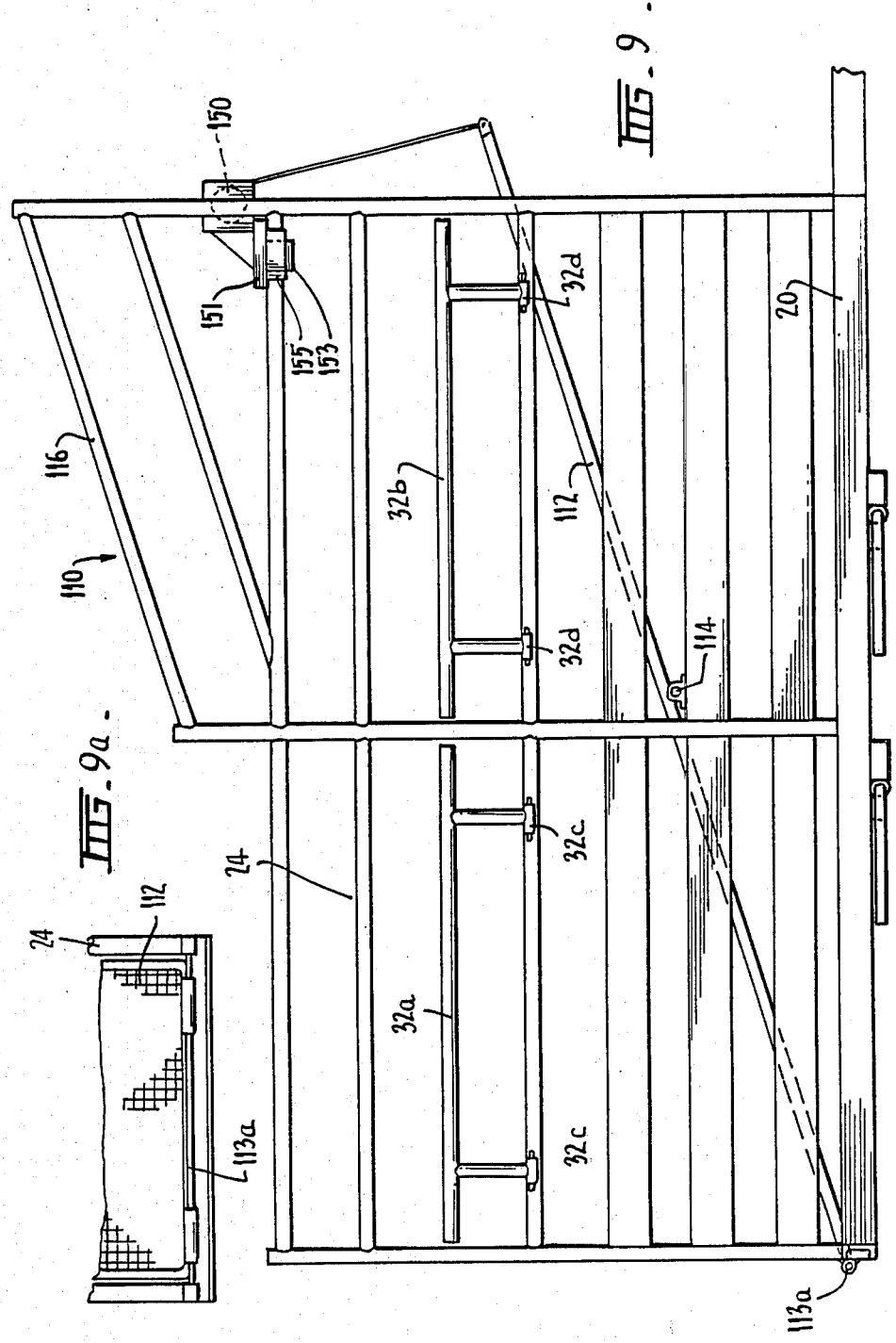

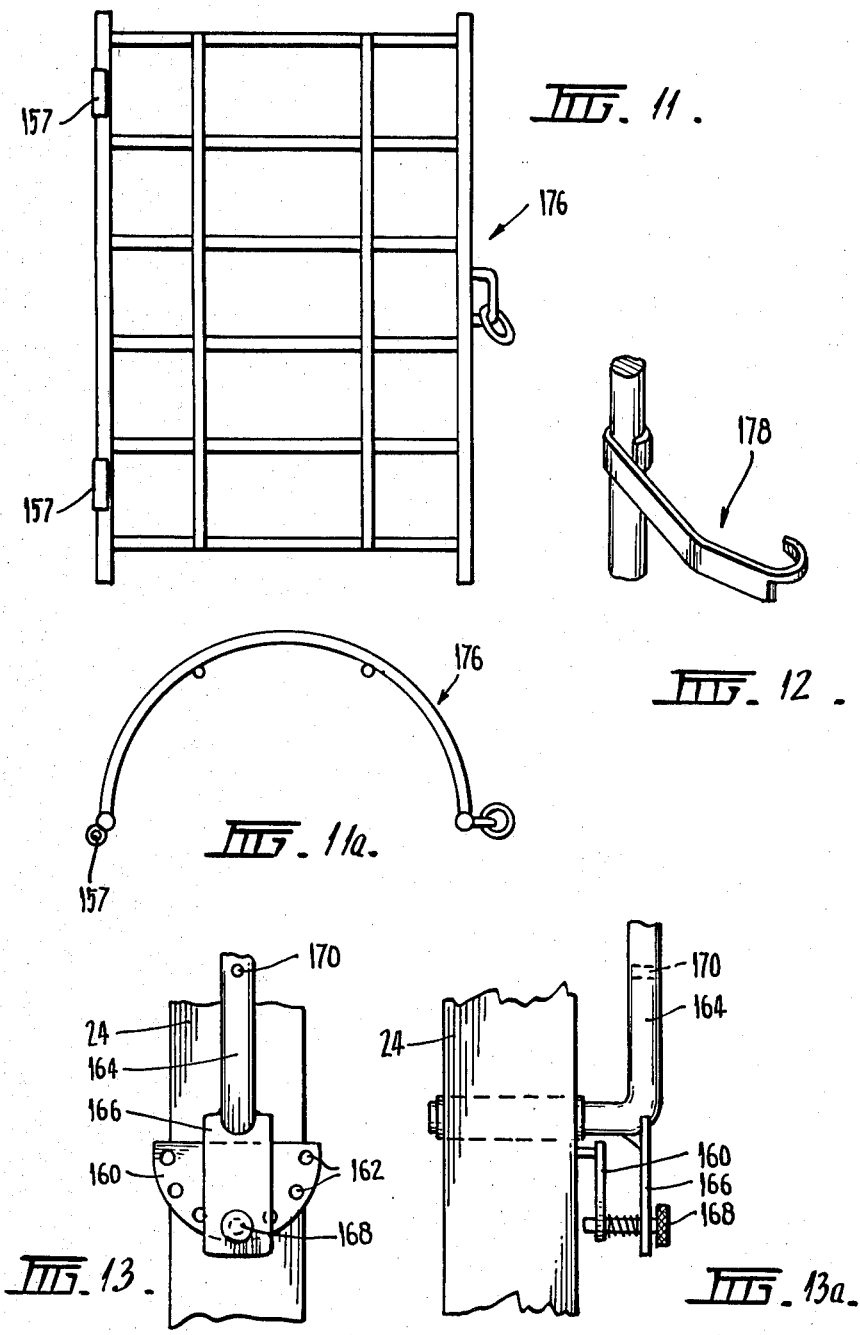

TRANSPORTABLE STOCK UNIT

BACKGROUND OF THE INVENTION

This application is a continuation-in-part application of Ser. No. 54,852, filed July 5, 1979, now abandoned, and relates to a portable stock race and yard.

When it is desired to treat stock such as cattle, the stock is typically herded into a stock yard and then passed one at a time through a stock race leading off the yard. While in the race, the animals are subject to treatment such as drafting or drenching and then released through a front gate.

This method of handling the animals requires the presence of a yard and race at a location adjacent to the animals. Alternatively, the animals have to be transported to the nearest yard and race which is inconvenient and expensive.

BRIEF DESCRIPTION OF THE INVENTION

The present invention provides a portable stock race and yard which can be towed to a location where animals to be treated are situated and set up on the spot.

In accordance with the present invention, there is provided a portable stock race and yard comprising a stock race mounted on wheels to enable it to be towed, and a plurality of wings swingably connected to sides of the stock race and arranged to be folded out to form at least part of the periphery of a stock yard.

In a second aspect of the invention there is provided a portable stock race having two opposed sidewalls and a floor, said floor being swingably connected at one end to the race to allow the floor to be raised to form a loading ramp.

In a third aspect of the invention there is provided a wheel raising and lowering mechanism for a portable stock race having a plurality of wheels, said mechanism including support means for securing the wheels to the stock race and a lever mechanism, said lever mechanism having at least one arm rigidly connected to said support means and means for retaining the wheels in a lowered position, such that when the retaining means is released, the stock race drops under the force of gravity thereby forcing the wheels to pivot upwardly relative thereto, and wherein said wheels may be lowered by rotating said at least one arm to lift said race and thereby lower the wheels relative to the race.

This mechanism allows the race to be securely settled on the ground to enable cattle to conveniently enter the race. In a fourth aspect of the invention there is provided a cattle holding means comprising a frame having a space therein, a movable arm pivotally connected at one end to said frame for movement in a plane substantially parallel to the frame, said frame having locking means for locking the arm in a desired position to hold an animal projecting through said space.

The present invention will now be described by way of example with reference to the accompanying drawings, in which:

BRIEF DESCRIPTION OF THE DRAWINGS

FIG. 6 is a side elevation of a wing arranged to be hingedly attached to the stock race of FIG. 1;

FIG. 7 is a side elevation of a screen arranged to be hingedly attached to a wing attached to the wing of FIG. 6;

FIG. 7a is a view of a bracket having a ring;

FIG. 9 is a side view of the race showing the floor in an elevated position;

FIG. 9a is an end view of the race;

FIG. 11 is a view of a bail safety device for connection with the race;

FIG. 11a is an end view of a bail safety device;

FIG. 12 is a view of a wing catch for securing the wings to the side of the race; and FIGS. 13 and 13a are details of mechanisms for varying the inclination of hook members to accommodate uneven terrain.

DESCRIPTION OF THE PREFERRED EMBODIMENT

Figure 1:
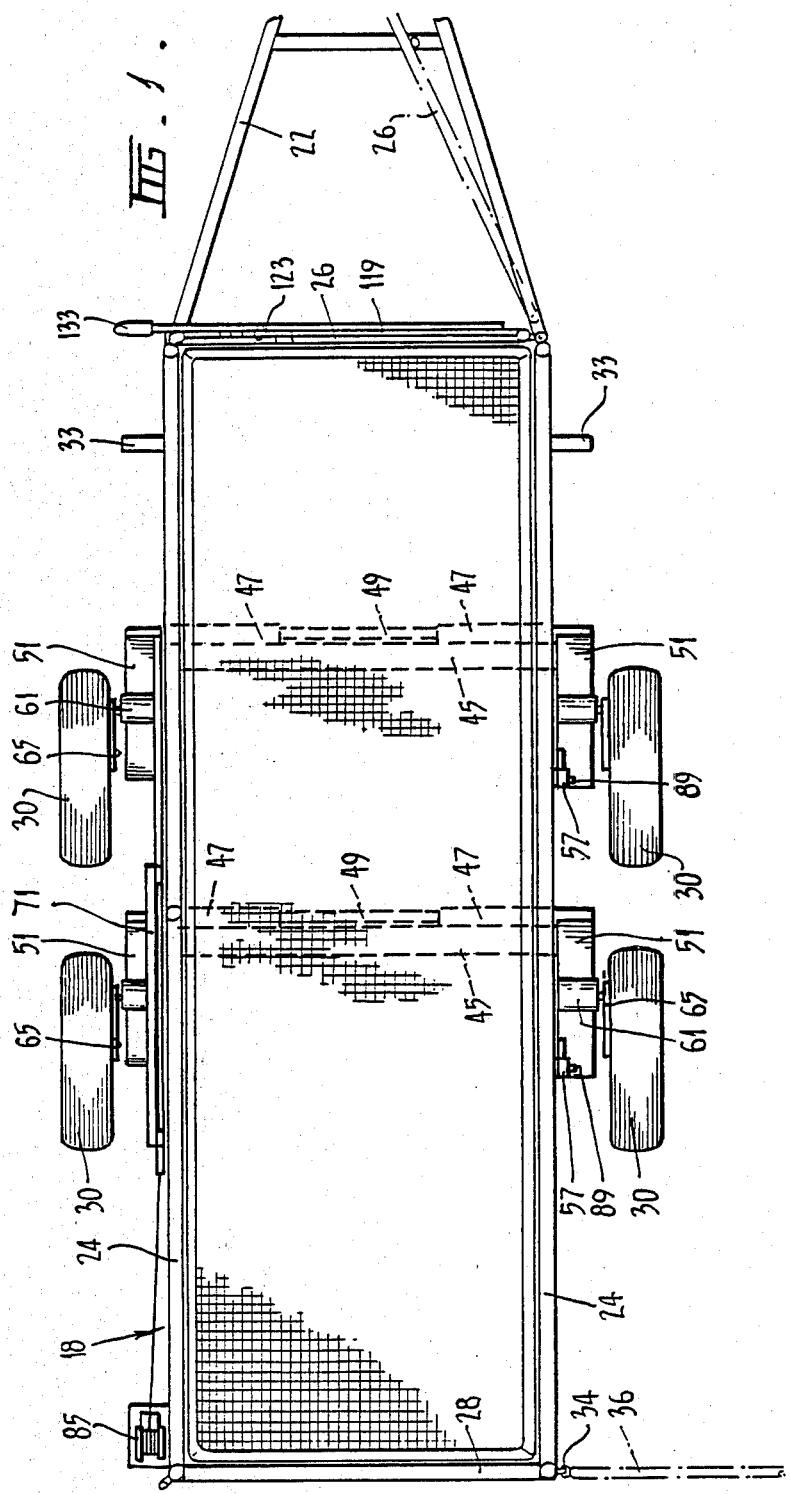
FIG. 1 is a plan view of a stock race forming part of the present invention.
Figure 2:
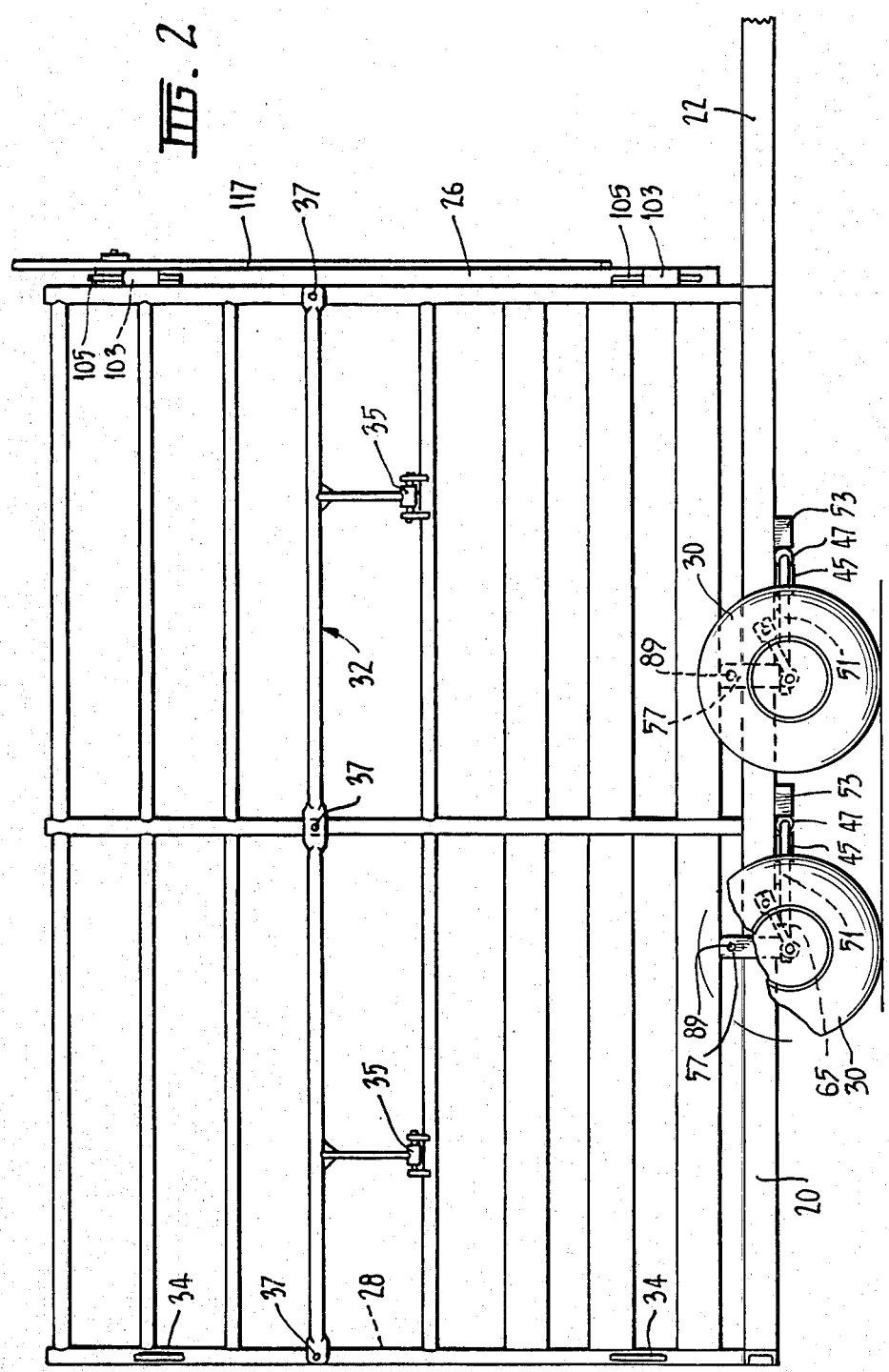
FIG. 2 is a side elevation of the stock race of FIG. 1.

In FIGS. 1 and 2 there is shown a stock race 18 in accordance with the present invention comprising a rectangular chassis 20 terminating in a triangular nose 22 equipped with means for attachment to a driven vehicle.

Mounted on the longer sides of the chassis 20 is a pair of sidewalls 24. A front gate 26 is located between the sidewalls 24 adjacent the nose 22. The front gate 26 opens forwardly as shown in phantom in FIG. 1. A rear gate 28 is located between the sidewalls 24 at the end thereof remote from the nose 22.

A pair of wheels 30 is mounted on each side of the chassis 20 in a manner to be more fully described hereinafter. The wheels 30 enable the stock race to be towed but are retractably mounted as will be described in detail hereinafter, to enable them to be raised when the stock race is required for use.

For travel purposes each pair of wheels 30 may be provided with an outwardly extending mud guard and mud flap assembly (not shown) which is preferably arranged to be removed from the stock race 18 to allow the wheels 30 of the race to be raised. Wing support means is provided in the form of outwardly projecting posts 33.

As can be seen in FIG. 2 each sidewall 24 has adjacent its rear end a pair of hook members 34 at 90° to the plane of the sidewall 24 vertically disposed from one another on which a wing 36 (FIG. 1) is hingedly mounted by means of appropriately spaced and sized tubes.

The walls 24 of the stock race are provided with a hinged section 32 which may be lowered by pivoting the section 32 about hinge couplings 35 after removing securing pins 37 which retain the hinged section 32 in an upper position shown in FIG. 2. The hinged section 32 may be lowered to provide workmen with better access to animals held in the race 18.

The hinged section 32 may be provided in two separate sections (see FIG. 9) each of which extend half the length of the wall 24. This structure would enable a workman to have access to the front portion of the race 18, for example, while keeping the rear portion closed. This may be advantageous if two animals are in the race 18 together.

Figure 3:
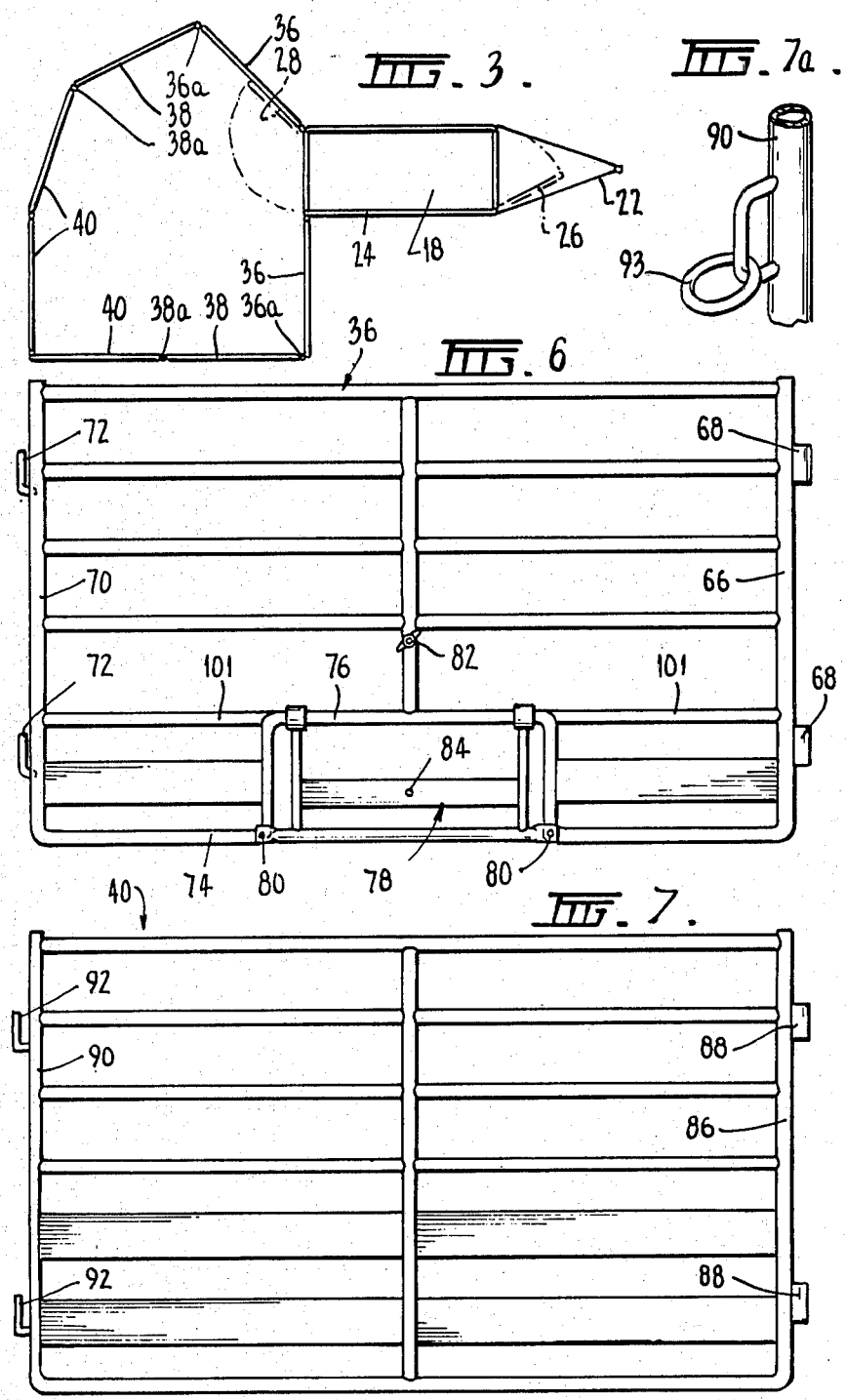
FIG. 3 is a schematic plan view of a portable stock race and yard of the present invention.

In FIG. 3 there is shown the stock race 18 of FIGS. 1 and 2 with a number of wings and screens opened out to form a stock yard. The wing 36 is hingedly mounted on a pair of hooks 34 as described above at each rear side of the race 18. As seen in FIG. 3 the wing 36 on the right is opened out at 90° to the stock race 18. The wing 36 on the left is opened out at about 150° to the stock race 18. Additional wings 38 are hingedly attached to free ends 36a of the wings 36.

The right hand additional wing 38 is disposed at 90° to the wing 36 to which it is attached while the left hand additional wing 38 is disposed at about 150° to the wing 36 to which it is attached. The stock yard is completed by three screens 40 which are hinged together as 38 is to 36 and to the free ends 38a of the additional wings 38 by upper and lower rings aligned with hook members on the free ends 38a.

In use stock such as cattle is herded into the erected stock yard through a gate opening provided by removing rings from lock position and swinging back partially a wing 38 or one of the screens 40, and then passed through the race 18 one at a time for treatment. The gates 28 and 26 are opened as required to admit or release stock to or from the race 18. When all of the cattle have been treated, the yard is dismantled as follows.

The screens 40 are detached from one another and the wings 38 are stored. Preferably they are of such a size and shape that they can be laid on the floor of the race 18. The wings 38 may be folded back until they are parallel with the wings 36. The wings 36 and 38 together may be folded back until they are parallel with the sidewalls 24 of the race 18. The wings 36 and 38 are then secured to the sides of the stock race by any suitable means for transport to another location.

Modifications are possible to the size and shape of the stock yard. Thus, the number of screens 40 can be reduced or enlarged and the disposition of the wings 36 and 38 can be varied to suit particular requirements. Also, if desired, the whole assembly can be annexed to an existing yard.

Also, additional hingedly mounted wings can be incorporated to provide for a larger yard. However, this can have the disadvantage of excessive width of the portable race and yard during transportation. Extra screens can be placed inside the race to provide for a larger yard.

Figure 4:
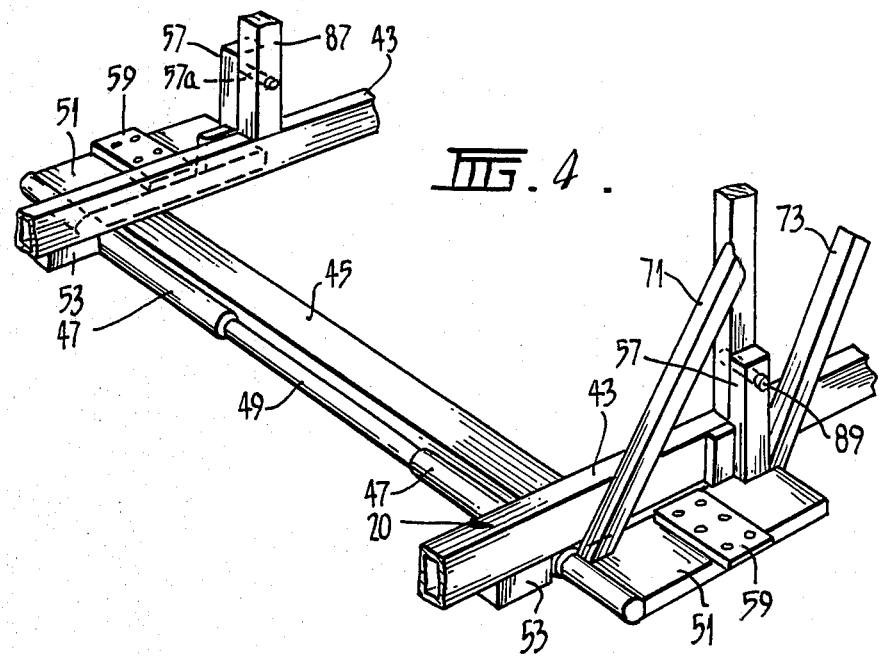
FIGS. 4, 4a and 4b are views of an axle assembly and axle and wheel mounting in accordance with the present invention.
Figure 4B:
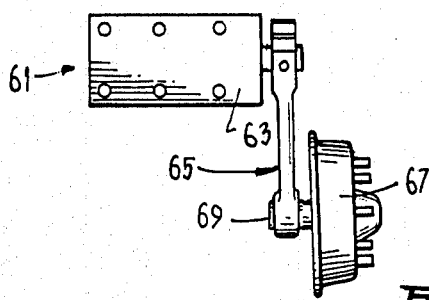
Figure 4A:
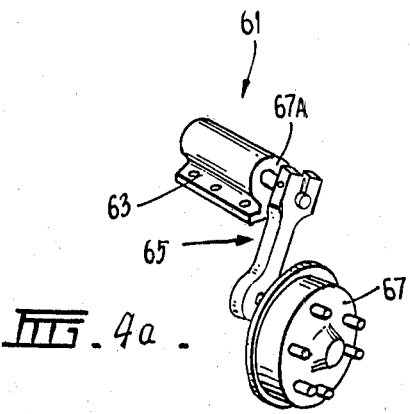
Figure 4C:
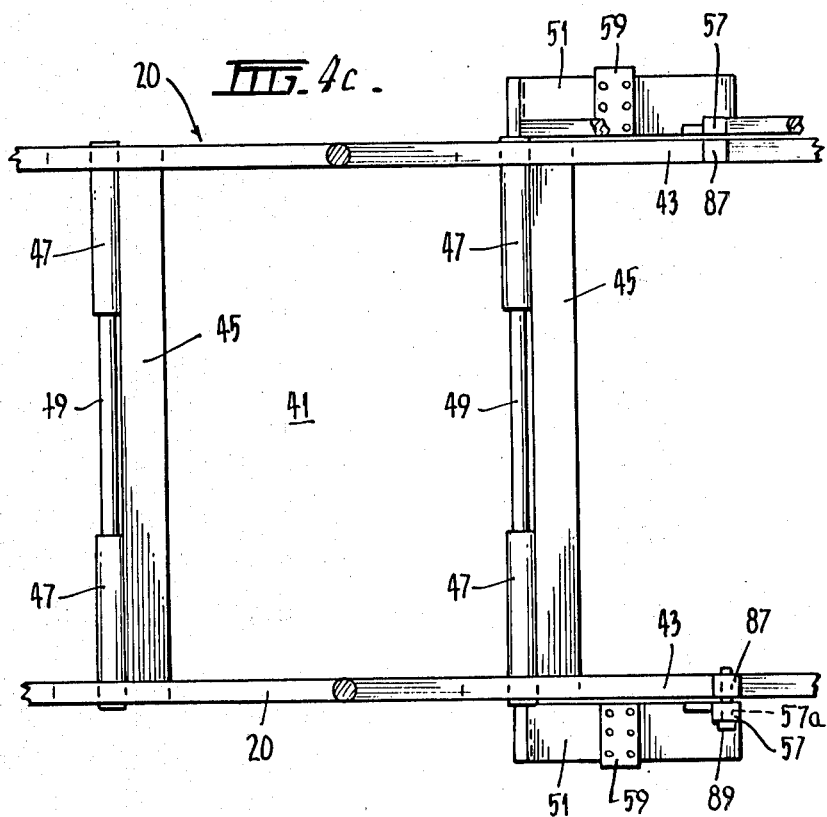
FIG. 4c is a partial view of the chassis of FIG. 1 with the floor removed showing the axle assembly mounted thereon.

FIGS. 4 to 4c show the manner in which wheels 30 are mounted on the race. Referring first to FIG. 4c a mid-section 41 of the rectangular chassis 20 is shown. This mid-section 41 includes side members 43 which support sidewalls 24 (FIGS. 1 and 2) and cross members 45. Two tubular members 47 are secured to each of the cross members 45 (only shown for one of the members in FIG. 4c). A pivot axle 49 is provided in the tubular member 47 and is provided with a plate 51 securely connected to each end thereof. The plates 51 together with pivot axle 49 may rotate in tubular member 47. Blocks 53 may be provided to provide additional support for the tubular members 47 (FIGS. 4 and 5).

Turning now to FIG. 4 which shows the pivot axle 49 and plate 51 in more detail, at least one of the plates 51 carries a strut 57 having a transverse hole 57a therethrough. The purpose of the strut 57 is to assist in holding the wheel 30 in the lowered position as will be described hereinafter.

The plates 51 each carry a mounting plate 59 arranged transversely on plate 51. The plate 59 is for mounting a Flexitor 61 which carries wheels 30. The Flexitor 61 is shown in FIGS. 4a and 4b in perspective and from beneath, respectively and is believed to be well known and shall therefore only be briefly described. The Flexitor 61 has a support 63 which is bolted to mounting plate 59 by means of aligned holes in the mounting plate 59 and Flexitor 61. An axle assembly 65 is embedded in resilient material 67a which acts as a shock absorber. The axle assembly 65 has a wheel hub 67 which carries wheels 30. The wheels 30 and wheel hub 67 rotate with an axle 69 in axle assembly 65.

Figure 5:
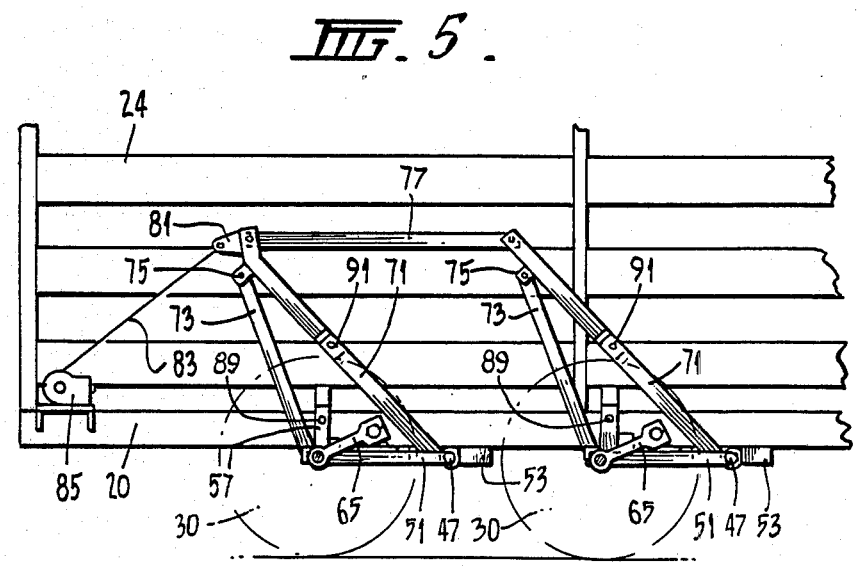
FIG. 5 is a view of a lever means for raising and lowering wheels of the stock race.

The wheels 30 which are connected to a pivot axle 49 by the plate 51 and Flexitor 61 may be raised and lowered by a lever mechanism shown in FIG. 5. For convenience, the wheels 30 are shown in phantom and the Flexitor is not shown in FIG. 5. Also, the same lever mechanism is provided on the far side of the chassis shown in FIGS. 4 and 4c. The Flexitors 61 support the wheels with the axle assemblies 65 extending downwardly and rearwardly.

The mechanism comprises two lever arms 71 and 73 connected to each plate 51. The lever arms 71 have a tab 75 to which the lever arms 73 are pivotally connected slightly inwardly from the end of the lever arms 73. The lever arms 71 are pivotally connected to a beam 77.

The first one of lever arms 71 has a second lug 81 which is used to secure a line 83 from a winch 85.

The struts 57 assist in holding the wheels in the lowered position by means of pins 89 which pass through holes 57a and engage in holes in the fixed struts 87 (FIG. 4c) provided on side member 43 and sidewall 24. The line 83 which is held under tension by the winch may also assist in holding the wheels 30 in the lowered position.

To raise the wheels, the pins 89 are removed and winch 85 is released so that line 83 may be slowly unwound therefrom. Gravity will tend to pull the race 18 downward which will cause the lever mechanism to rotate clockwise in the direction of arrow A (FIG. 5) thereby raising the plate 51, which pivots with pivot axle 49 in tubular members 47, relative to the sidewalls 24.

When it is desired to return the wheels to the lowered position, the winch is used to retract line 83 which draws the lever mechanism counterclockwise in the direction of arrow B (FIG. 5) which causes the race 18 to move upwardly and the wheels to move down relative to the walls 24 until the lever mechanism again takes up the position shown in FIG. 5. The pins 89 may then be relocated in holes 57a to support the wheels in the lowered position.

The lever mechanism may be removed from the side of the race to provide more room for wings 36 when they are folded against walls 24. This may be accomplished by disconnecting the pivot points and separating the two lever arms 71 at 91 where the arm is telescoped together and held by a suitable pin (not shown).

As an alternative to the lever mechanism, a hydraulic mechanism (not shown) may be used to move and lower the wheels.

In FIG. 6 there is shown the construction of a wing 36. On a right hand vertical frame member 66 there is provided a pair of tubes 68 which fit on the hooks 34 on a sidewall 24 of the race 18.

On a left hand vertical member frame 70 are a pair of hooks 72 on which is mounted a wing 38. The hooks 72 are orientated at 135° to the plane of the wing 36 which assists in folding the wing 38 against the wing 36. The construction of the wing 38 is essentially the same as that of the wing 36 except that the hooks 72 are orientated at 180° to the plane of the wing 38.

A lower horizontal frame member 74 has a raised central portion 76 (FIG. 6). A flap 78 is hingedly mounted on the central portion 76. When the wing 36 or 38 is in use, the flap 78 is in the lowered position shown in the drawing to prevent animals escaping from the yard. In this position it is connected to the frame member 74 such as by linch pins 80. When the race is to be transported the flap 78 has to be raised to clear the wheels 30.

The link pins 80 are released and the flap 78 folded up and retained in place by means of a wing nut 82 engaging with a stud extending through a small hole 84. Alternatively, the flap 78 may extend the entire length of the wing 36 and be merely pivoted on a crosspiece 101, for example.

In FIG. 7 there is shown a screen 40 which comprises a right hand frame member 86 having a pair of tubes 88 arranged to be mounted on the hooks 72 of the wing 38 or another screen 40. A left hand frame member 90 is provided with a pair of hooks 92 which can engage with a further wing or screen 40. In this case, the hooks 92 can be replaced by brackets having rings 93 through them (see FIG. 7a). The use of the rings 93 facilitates opening of a screen 40 to let stock into the yard.

Figure 8:
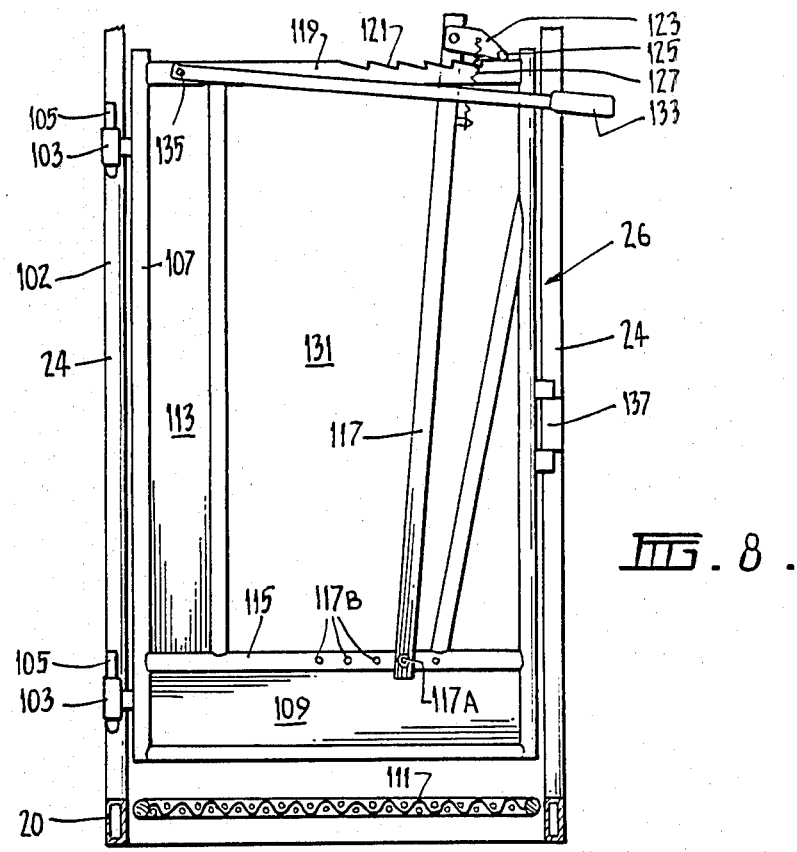
FIG. 8 is a view of a front gate of the stock race.

FIG. 8 shows the gate 26 in more detail which includes a means for holding an animal while a workman treats the animal.

The gate is hinged to an upright 102 of the wall 24 by means of tubes 103 and rods 105. The tubes 103 being located on gate 106 and the rods on upright 101.

The gate comprises a rectangular frame 107 which has a lower panel 109 and a side panel 113 above floor 111 of the race 18. A crosspiece 115 above panel 109 has holes 117B holding an animal locking bar 117 by means of a pin 117A which passes through the bar 117 and hole 117B. An upper crosspiece 119 has a rachet mechanism 121 thereon. The bar 117 has a biased locking device 123 by means of knob 125 which may engage in the rachet 121. The device 123 is biased by return spring 127.

When an animal is in race 18 it is forced to pass its head through opening 131 between panel 113 and bar 117. The bar 117 is moved to the right in the figure until it holds the animal's head wherein the knob 125 engages in one of the teeth of rachet 121. The animal is therefore held so that a workman may treat the same. To release the animal, a bar 133 pivoted at end 135 is moved upwardly so that it engages knob 125 which projects outwardly from the plane of the figure and the bar 117 may be drawn back to the position shown in the figure. The gate 26 may then be opened by releasing a suitable catch 137.

The portable stock race and yard described above can be towed by a car on a sealed surface at up to 100 kph. It can be fitted with a removable rear lighting unit. Further, it can be fastened to the ground by pins extending through plates and into the ground. It can be set up off an existing yard, in a corner of a paddock or off a gateway or anywhere.

The unit can be set up by one man. Although it is mainly designed for cattle, other animals such as sheep can be held in the yard and race.

The stock race shown in FIGS. 9 and 9a comprise a floor 112 which can serve as a loading ramp and which is hingedly attached by hinges 113a to the chassis of the stock race 110 at the rear thereof. The front end of the floor 112 is free and so that floor 112 can be raised by any suitable means to the position shown in FIG. 9, such as the winch means shown in FIG. 10 which will be described hereinafter. In the raised position the elevated end of the floor 112 is aligned with the tray of a truck to enable stock to be loaded into the truck.

The floor 112 is typically formed from a mesh of a mesh size suitable for supporting the hooves of stock. When in the lowered position shown in FIG. 1, the mesh is supported on chassis members arranged to give it sufficient support for stock.

To prevent undue flexing of the floor 112 in the elevated position, a support bar 114 may be inserted at a suitable position between a member of the sidewalls of the race and the underside of the floor 112.

For the embodiment shown in FIG. 9, additional inclined side frame members 116 are provided adjacent the front of the race to reduce the possibility of stock jumping over the side of the race.

Further, front gate 26 of the race is arranged to be opened out by 90° so as to lie parallel to the adjacent sidewall 24 when the floor is elevated.

As described in relation to FIG. 5, the stock race may comprise a pair of wheels on each side thereof. The wheels are arranged to be raised and lowered by manual operation of the lever mechanism (not shown in FIG. 9).

Figure 10:
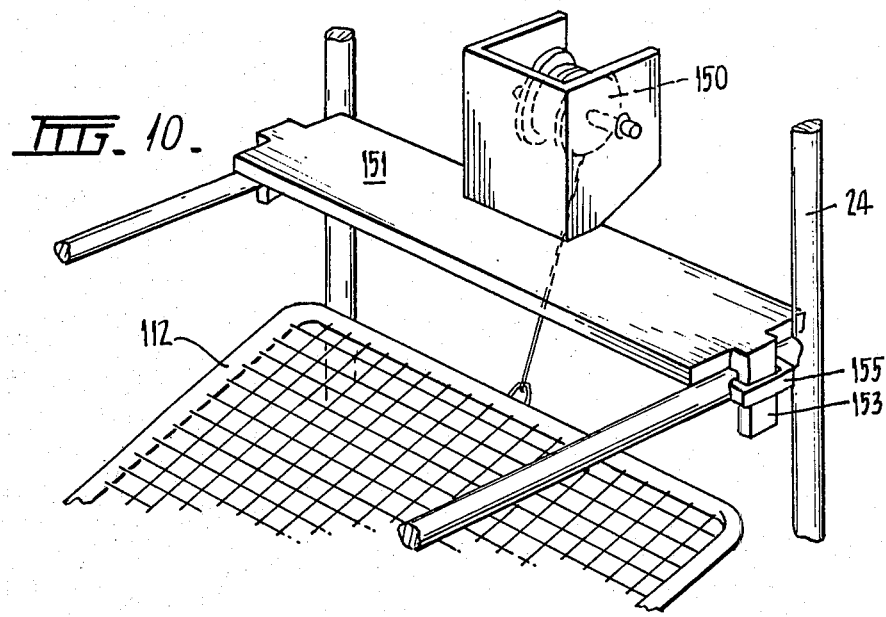
FIG. 10 is a view of a winch for raising the floor.

FIG. 9 also shows two separate hinged sections 32c and 32b referred to with reference to FIG. 2. These sections are secured in the upright position by pins (not shown) in a similar manner to section 32 of FIG. 1 and may pivot about hinge couplings 32c and 32d when the pins are released. The floor 112 may be raised by means of a second winch 150 which is better shown in FIG. 10. As seen in FIG. 10, the winch 150 is secured to a board 151 which has a depending leg 153 of each end thereof. The legs 153 are received in a holder 155 located at the top front portion of each sidewall 24. The board 151 with the winch 150 located therein may be removed from the top of the walls 24 by merely lifting the board 151 upwardly.

In FIGS. 13 and 13a there is shown a mechanism for varying the inclination of hook members which are used for attachment of the wings 36 and/or screens 40. The variation of inclination is provided to enable the apparatus to accommodate more readily uneven terrain which may cause adjacent wings or screens to be orientated at different angles.

The mechanism comprises a positioning plate 160 provided with a plurality of apertures 162 describing an arc. The plate 160 as shown is mounted on an upright frame member below a hook 164 pivotally mounted in a hole in the upright frame member. The hook 164 is retained in place by any suitable means such as pins. A bolt aligning support 166 is fixed to the underside of the hook 164. A bolt 168 is retractably mounted in an aperture in the support 166 and is spring urged into engagement with an aperture 162. To vary the inclination of the hook 164, the bolt 168 is withdrawn from an aperture 162. The hook and support assembly is pivoted until the bolt 168 is in alignment with another aperture 162 whereupon it is released and allowed to engage with the said another aperture.

As can be seen in FIG. 13a, the hook 164 may be elongated to, for example, a 10" height, with an aperture 170 adjacent the mid point of its vertical limb. This construction also enables wings 36 or the like to be raised for accommodating uneven terrain, a pin being inserted in the aperture 170 to maintain the wing in the raised position. Alternatively, this construction can be used to provide a mounting for additional wings to make an inner forcing yard by placing the mounting of one wing above another on the hook 164.

In FIGS. 11 and 11a there is shown a bail safety guide 176 for attachment to the front of the race 18. This comprises a meshed member which is semicircular in horizontal cross section and is provided with means 157 for pivotal attachment to the frame of the race adjacent the front gate. When the bail safety guide 176 is closed, it helps avoid the tendency for cattle to try and push through the front gate since it gives the appearance of an obstruction.

The wings 36 hereinbefore described may be attached to the sides of the race by means of a spring clip 178 as shown in FIG. 12.

The spring clip 178 may conveniently be rotatably attached to a vertical central frame member of the side of the race. When the wing members are folded against the side of the race, the spring clip is rotated until it engages and latches with vertical frame members of the wings to hold them in place.

The embodiments of the invention in which an exclusive property or privilege is claimed are defined as follows:

1. A portable stock race and yard comprising a stock race mounted on wheels to enable the stock race to be towed and a plurality of wings swingably connected to sides of the stock race and arranged to be folded out to form at least part of the periphery of a stock yard wherein each wing has a section extending at least partially along the length thereof pivotally connected thereto, which is adapted to be pivoted upwardly into a raised position to form an opening through the wing for the passage of said wheels of the stock race through the wing when the wing is folded against the side of the race and retaining means for retaining the said section in a raised position when the wing is folded against the side of the race.

2. A portable stock race according to claim 1 wherein one of said wings is swingably connected to each of said sidewalls of the race at one end of the race, said wings being rotatable into a position parallel and adjacent with said sidewalls when said race is to be transported between sites.

3. A portable stock race according to claim 2 wherein means are provided for selectively securing the wings against the sidewalls.

4. A portable stock race according to claim 2 or claim 3 wherein each of said wings has a further wing swingably connected thereto at the end thereof remote from the end pivoted to the race, the further wings also being rotatable into a position adjacent and parallel to its respective said one wing and the sidewall of the race and having a pivoted section for passage of the wheels.

5. A portable stock race according to either claims 1 or 3 wherein screens are swingably connected to said wings to complete the stock yard.

6. A portable stock race according to claim 1 wherein the section is a lower portion of the wing hinged for rotation relative to the race; and pin means for holding said section in a raised or lowered position.

7. A portable stock race according to claim 1 wherein the wings are hinged to the race and each other.

8. A portable stock race according to claim 1 wherein support means is provided for said wheels; said support means being pivotally connected to said race to permit the race to be lowered and raised relative to the wheels and the stock race to rest on the ground.

9. A portable stock race according to claim 1 wherein the sidewalls have a hinged section which may be lowered to provide access to the race; a gate for closing one end of said race and hinged to one side thereof.

10. A portable stock race according to claim 1 wherein the race has gates at each end thereof.

11. A portable stock race according to claim 1 wherein said stock race has a base frame and a pair of parallelogram frames, one on each side, each of said frames having a pair of sides and a base member, said base member being a portion of said base frame; said sides being pivotally connected to said base member, a pair of wheels, one mounted on each of said frames and spaced from said pivotal connection lengthwise of said stock race; winch means connected to each of said frames for pivoting said sides of said frames for raising and lowering said wheels relative to said base frame.

12. A portable stock race according to claim 11 wherein detachable struts are provided on each side for locking said wheels in downwardly extended position.

13. A portable stock race according to claim 1 wherein said stock race has a base frame and a pair of wheel support frames one on each side, each of said wheel support frames having an upstanding side member pivotally connected to said base frame at its lower end; an arm rigidly connected to each of said side members and projecting generally lengthwise of said base frame; one of said wheels connected to each of said arms at a point spaced from said pivotal connection between the side member and the base frame; means for controlling the pivotal position of said side members for raising and lowering said wheels with respect to said base frame.

14. A portable stock race according to claim 13 wherein said control means is a winch mounted to the sides of said stock race and having a cable connected to the upper end of each of said side members.

15. A portable stock race according to claim 13 wherein a pair of said side members are provided on each side of said stock race, a link connecting the upper ends of said side members on each side of said stock race; a wheel connected to each of said side members.

16. A portable stock race and yard comprising a stock race mounted on wheels to enable the stock race to be towed and a plurality of swingable arms connected to sides of the stock race and arranged to be folded out to form at least part of the periphery of a stock yard, said stock race having a floor, means pivotally connecting said floor at one of its ends to said stock race, winch means mounted on said stock race and connected to said floor at the end thereof remote from said pivotal connection to said race whereby said floor can be pivoted between horizontal and inclined positions while the sides of said race remain stationary.

17. A portable stock race according to claim 16 wherein said winch is connected to a beam extending between top portions of the sidewalls of the race at an end of the race remote from the end at which the floor is pivotally connected to the race, the beam together with the winch being removable from the race.

18. A portable stock race having a base frame, a floor, sides and transport wheels; said sides being rigidly attached to said base frame, said floor and sides forming an elongated passage for stock; a gate at the discharge end of said passage hinged to said sides; said gate having movable means for engaging an animal against movement lengthwise of said passage; movable sections in said sides hingedly mounted for opening and closing to provide access to an animal within said passage; means for pivotally connecting said floor to said base frame at the receiving end of said passage; control means at the other end of said passage for pivoting said floor with respect to both said base frame and sides to form an inclined ramp between said sides.

19. A portable stock race according to claim 18 wherein said means is a winch and cable.

20. A portable stock race having a base frame, a floor, sides and transport wheels; said sides being rigidly attached to said base frame, said floor and sides forming an elongated passage for stock; a gate at the discharge end of said passage hinged to said sides; said gate having movable means for engaging an animal against movement lengthwise of said passage; movable sections in said sides hingedly mounted for opening and closing to provide access to an animal within said passage; a pair of wheel support frames spaced in tandem on each side of said base frame and means pivotally mounting each of said support frames to said base frame; said wheel support frames each having an upstanding arm connected to the end of said support frame having said pivot means; a rigid link pivotally connecting the upper ends of said arms for simultaneous movement; a strut pivotally connecting the opposite end of each support frame to the upper end of the arm connected to said support frame; a winch and cable attached to one end of said link for pivoting said wheel support frames for raising and lowering said base frame with respect to the wheel supporting surface; lock members for securing said wheel support frames to said base frame when the base frame is in raised position with respect to said wheels.

21. A portable stock race having a base frame, a floor, sides and transport wheels; said sides being rigidly attached to said base frame, said floor and sides forming an elongated passage for stock; a gate at the discharge end of said passage hinged to said sides; said gate having movable means for engaging an animal against movement lengthwise of said passage; movable sections in said sides hingedly mounted for opening and closing to provide access to an animal within said passage; wing members hingedly connected to said sides at the receiving end of said passage, said wing members being pivotable to form a stock restraining yard; outwardly extending elements adjacent the discharge end of said race for supporting said wing members when folded against said sides to prepare said stock race for transport mode; said wing members having access openings therethrough to permit said wings to pass over said wheels when pivoted into storage position; panels pivotally connected to each of said wings for closing said access openings when said wings are extended into operating position.

* * * * *